US005464131A

United States Patent [19]

Keller

[11] Patent Number: 5,464,131

[45] Date of Patent: Nov. 7, 1995

[54] MANUALLY OPERATED DISPENSING DEVICE FOR A DOUBLE DISPENSING CARTRIDGE

[76] Inventor: Wilhelm A. Keller, Obstgartenweg 9, CH-6402 Merlischachen, Switzerland

[21] Appl. No.: 209,739

[22] Filed: Mar. 14, 1994

[30] Foreign Application Priority Data

Mar. 17, 1993 [CH] Switzerland .......................... 00803/93

[51] Int. Cl.$^6$ .............................. B67D 5/42; G01F 11/00

[52] U.S. Cl. .............................................................. 222/391

[58] Field of Search .................................... 222/135–137, 222/325–327, 391; 74/111, 112, 116, 169

[56] References Cited

U.S. PATENT DOCUMENTS

| | | | |
|---|---|---|---|
| 1,238,733 | 9/1917 | Arden | 222/391 X |
| 1,595,424 | 8/1926 | Sather | 222/391 |
| 1,977,532 | 10/1934 | Taylor et al. | 222/391 X |
| 2,229,839 | 1/1941 | Crewe | 222/391 X |
| 2,892,457 | 6/1959 | Sturtz | 222/391 X |
| 4,452,285 | 6/1984 | Leibhard et al. | 222/391 X |
| 4,471,888 | 9/1984 | Herb et al. | 222/391 X |
| 4,566,610 | 1/1986 | Herb | 222/391 X |
| 4,826,053 | 5/1989 | Keller . | |
| 4,911,328 | 3/1990 | Keller . | |
| 5,123,568 | 6/1992 | Keller . | |
| 5,137,181 | 8/1992 | Keller . | |
| 5,184,758 | 2/1993 | Keller . | |

FOREIGN PATENT DOCUMENTS

| | | |
|---|---|---|
| 0252401 | 1/1988 | European Pat. Off. . |
| 0408494 | 1/1991 | European Pat. Off. . |

OTHER PUBLICATIONS

European PCT Search Report, CH 80393, dated Nov. 11, 1993.

*Primary Examiner*—Kevin P. Shaver
*Attorney, Agent, or Firm*—Marks & Murase

[57] ABSTRACT

A manually actuated dispensing device for use with double dispensing cartridges for delivering two-component compositions comprises a double thrust ram for each cartridge and a drive member jointly acting on the thrust ram and being actuated by a trigger lever, the drive member comprising a thrust member which acts upon a toothing on the thrust ram. The thrust member comprises a driving dog provided with several teeth and being under the action of a spring, the driving dog acting substantially perpendicularly on the toothing of the thrust ram, and the thrust member acting essentially in the direction of the thrust ram or, respectively, the dispensing direction only. Such a dispensing device can be manufactured from a small number of low-priced parts of synthetic material and allows by the use of several teeth a substantial lowering of the contact-pressure, and a fast re-gripping of the trigger lever having a very small backlash.

11 Claims, 5 Drawing Sheets

MANUALLY OPERATED DISPENSING DEVICE FOR A DOUBLE DISPENSING CARTRIDGE

BACKGROUND OF THE INVENTION

The present invention refers to a manually operated dispensing device for use with a double dispensing cartridge for two-component compositions. In particular, this invention is related to a device as defined above, comprising a double thrust ram and an advance drive jointly acting upon the double thrust ram and being actuated by a trigger lever, the advance drive comprising a feed element acting on the thrust ram via a toothing of the latter.

Such a device is already commercialized in the form of a small dispensing device wherein the double thrust ram comprises a toothing at its lower surface meshing with a common advance tooth which is fixed to a ratchet and is movable along an arc of a circle. Due to the relatively high specific application pressure, it is necessary to manufacture the thrust ram of a high-quality synthetic material, on one hand, and to use metal parts for the trigger lever and the sole advance tooth or the ratchet, respectively, on the other hand. Thus, the manufacture of the device is expensive and its mounting is time consuming.

The U.S. Pat. No. 5,137,181 of the same applicant discloses several dispensing devices, one of the embodiments described therein shows that the thrust rams are provided on both sides with a toothing, the thrust member comprising ratchets which act upon the toothings. According to one embodiment, the actuating is effected by one thrust tooth each, arranged at both sides of the thrust ram and mounted at the end of a spring loaded thrust tooth holder. The devices disclosed in this document are designed for relatively large cartridges, each one of the thrust rods being provided with driving means.

SUMMARY OF THE INVENTION

Starting from this prior art, it is an object of the present invention to provide a dispensing device wherein the specific application force is lowered in such a manner that the use of unexpensive plastics parts which are easy to mount becomes possible and, at the same time, the application force is increased and a finer grip repetition is obtained.

This object is attained with a manually operated dispensing device for double dispensing cartridges delivering two-component compositions, comprising a housing, a double thrust ram and drive means jointly acting upon the double thrust ram and being actuated by a trigger lever, the drive means comprising a thrust member driving the thrust ram via a toothing of the latter, wherein the thrust member comprises a driving dog being under the action of a spring and having several teeth, the driving dog acting essentially perpendicularly on the toothing of the thrust ram, and the thrust member acting substantially in the direction of the thrust ram only.

In preferred embodiments of the present invention, the improvement of the advance or dispensing movement of the thrust member in the direction of the thrust ram is obtained by the fact that the device comprises arc compensating elements coacting with the trigger lever and which are capable of moving parallel or respectively perpendicularly to the thrust rams.

BRIEF DESCRIPTION OF THE DRAWINGS

The invention will now be illustrated further by means of embodiments with reference to the drawing wherein.

DETAILED DESCRIPTION OF THE INVENTION

Figure 1:
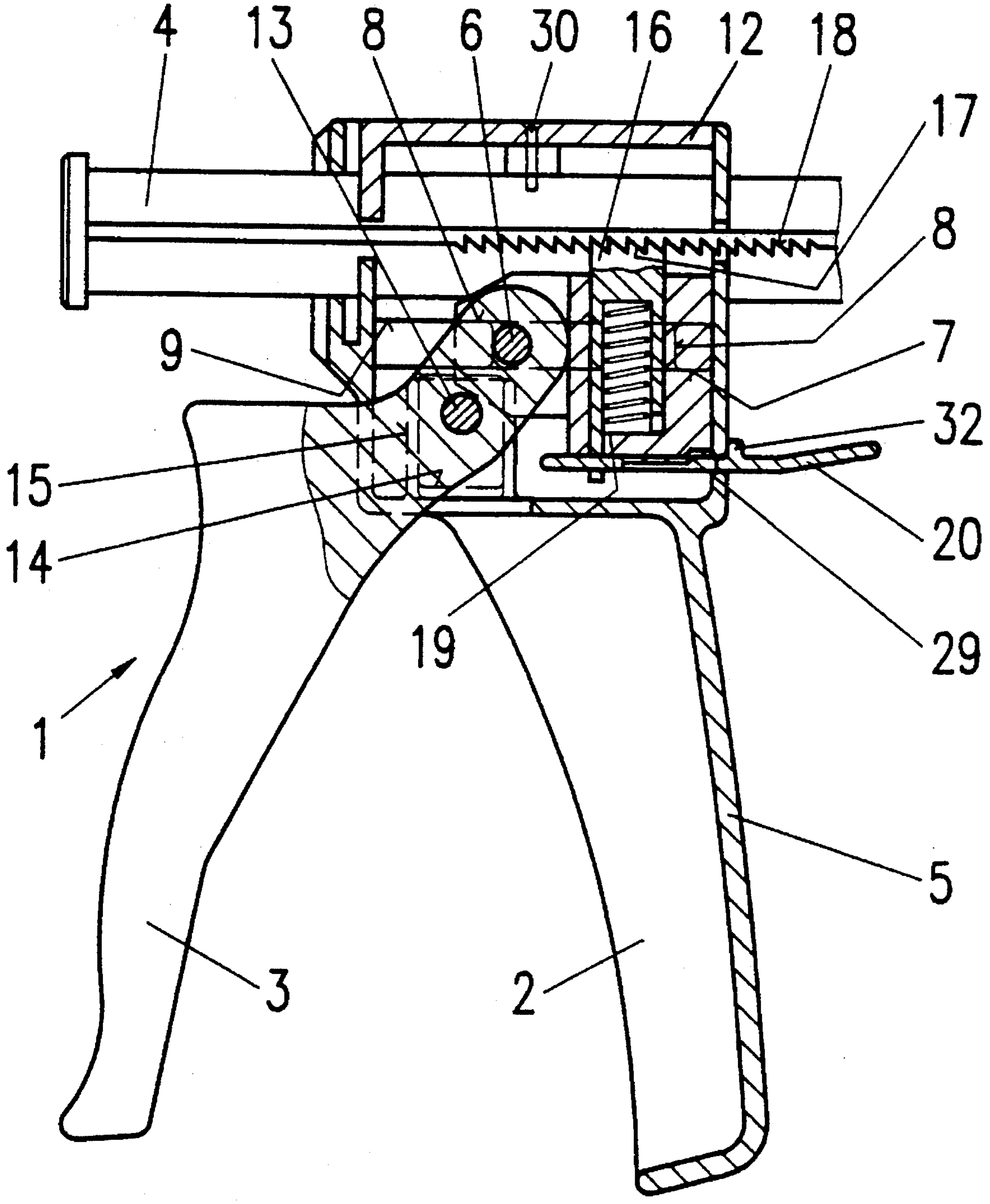
FIG. 1 shows a longitudinal section of a dispensing device according to the invention.

The embodiments of the devices of the present invention are shown in the drawing in a partially simplified schematical manner, unimportant details and those known per se being omitted.

The devices are designed as to be manufactured in a specially unexpensive manner. Nevertheless, a dosage as exact as possible is desired and a precise maintaining of the proportioning of the compositions to be discharged as well, and this means that high requirements as to the mechanical components of such a device must be met. The advance movement must be smoothly running and be precise as well and must not be jammed even under high load. Furthermore, substantially higher advance forces are requested. The force transmitted from the trigger lever should be exerted as exactly as possible in the direction of the thrust rams, and in order to accomplish a demultiplication as great as possible, the toothing pitch must be as fine as possible but still in such a manner that the relatively high forces are properly transmitted.

Figure 2:
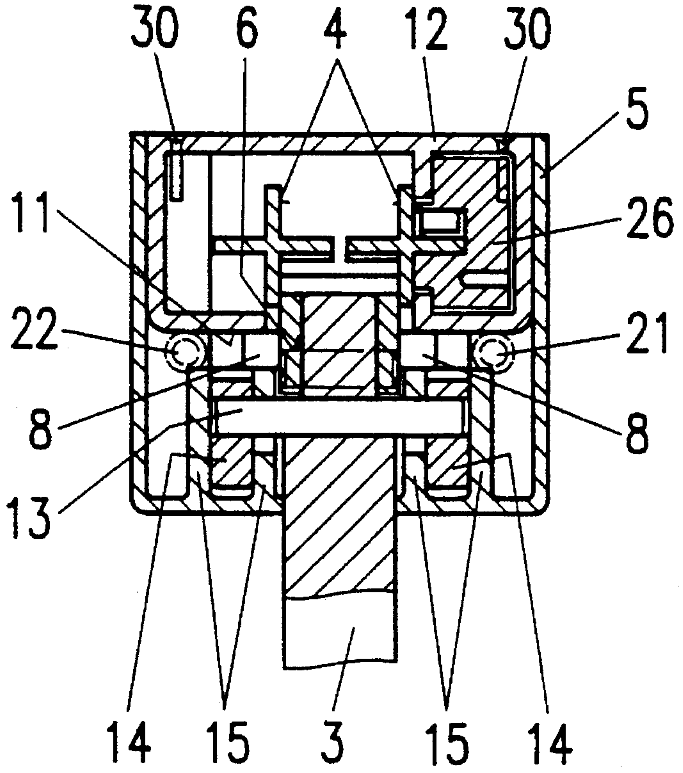
FIG. 2 shows a front view of the dispensing device of FIG. 1.

The device 1 comprises a handle 2 having a trigger lever 3 which acts via actuating parts on a double thrust ram 4 which drives dispensing pistons (not shown) of a double cartridge in order to deliver the two components in the cartridge. The handle 2 is integrally shaped with the housing 5, this housing containing different guides, ribs, etc. which will be better understood from the following description. The trigger lever 3 is connected at its upper portion by a bolt 6 with a sledge shaped thrust member 7 which is guided by four guiding cams 8, see FIG. 2, within two guides 9 in the lower housing portion and between them and the underside 11 of the housing cover 12, whereby any upward deviation of the sledge 7 is avoided when the trigger lever is actuated. The bolt 6 is arranged in the sledge in such a manner that it is axially secured within the housing.

The trigger lever 3 is furthermore articulated by a second bolt 13 to two arc-compensating elements shaped as sliding blocks 14 which are movable up and down, i.e. perpendicularly to the direction of the thrust rams 4, in correspondingly shaped compartments 15 in the housing. This arc compensating mechanism renders possible a maximal volume utilisation of the upper portion of the trigger lever and thus allows the use of synthetic materials instead of metal. The dimensions of the housing compartments 15 are selected such that a sliding of the sliding blocks without any play but with only minimal friction is accomplished. Since the thrust member 7, on actioning the trigger lever 3, cannot yield upward since it is retained by the housing cover 12, the trigger lever must necessarily yield downward on arc compensating.

The transmission of the movement of the thrust member to the thrust ram is effected by a driving dog 16 which has, in the present example, four teeth 17 which mesh with a toothing 18 provided at the underside of the thrust rams 4. The driving dog 16 having teeth 17 is shaped as a hollow body housing a pressure spring 19. The pressure spring is supported by the thrust member 7. In order to render possible the retreat of the thrust rams 4 for changing the cartridges, a lever 20 being guided at the housing acts upon the driving dog 16 in order to decouple its teeth from the toothing 18 of the thrust rams 4.

Figure 5:
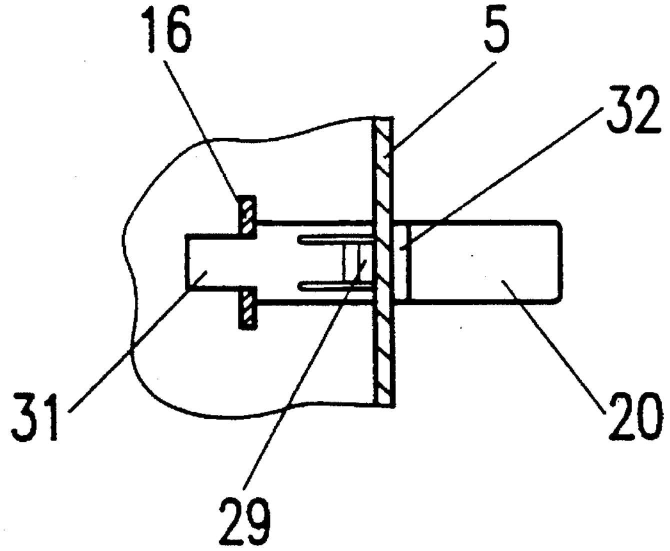
FIG. 5 shows a top view of the detail in FIG. 4.

FIG. 5 shows in detail the mounting of the lever 20. Seen from outside, the lever comprises a swelling 32, a cut-in clip 29 and a tongue 31 for inserting into a prolongated wall of the driving dog 16. On inserting, the lever 20 is introduced through a corresponding opening in the wall of the housing 5, whereupon the clip 29 springs upward and latches the lever against falling out.

Figure 3:
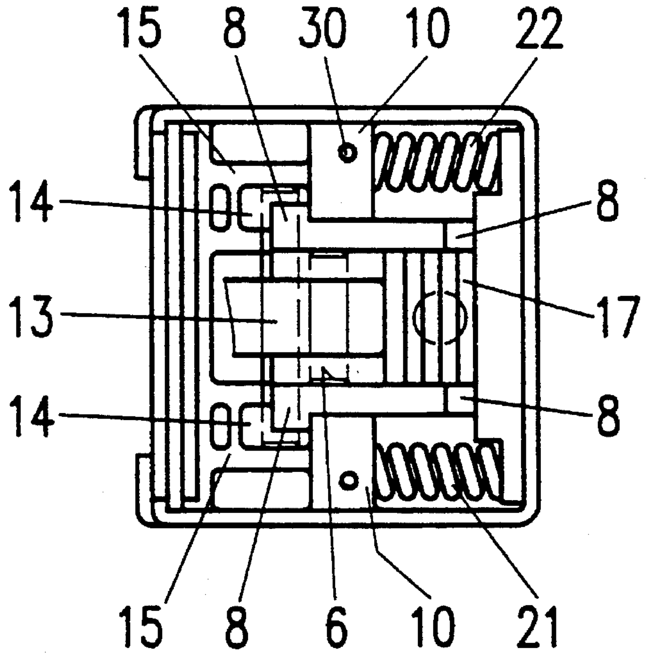
FIG. 3 shows a top view of the dispensing device of FIG. 1.

Seen from above, FIG. 3 shows that two pullback springs 21 and 22 are provided in order to bring the thrust member and also the trigger lever into their starting position. The springs are supported by two ribs 10. The springs might also traverse and support on the inner surface of the wall of the housing. Furthermore, screw holes 30 for fixing the cover 12 of the housing are shown. Instead of fixing the cover by screws, it may also be guided and fixed in grooves or recesses of the housing.

Figure 4:
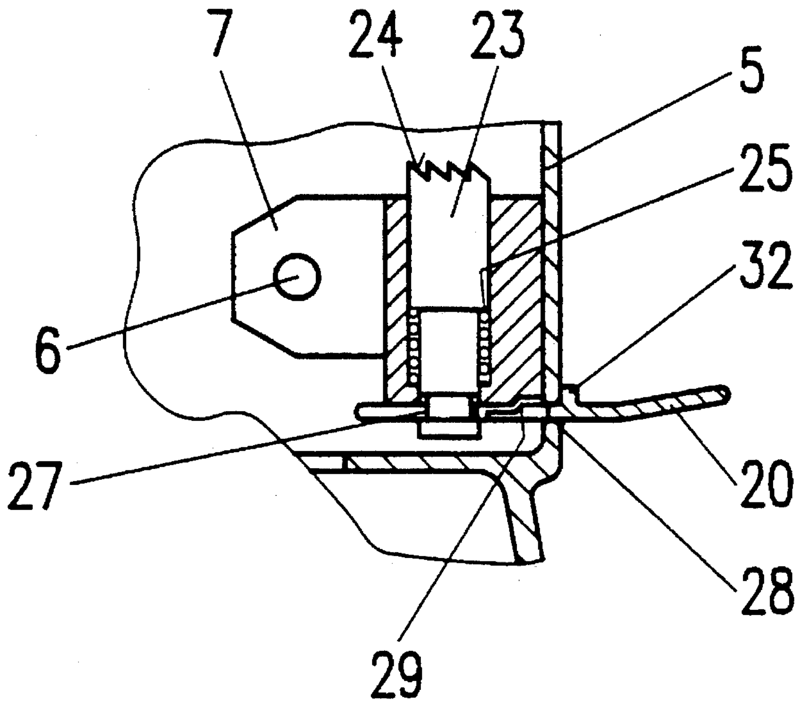
FIG. 4 represents a detail of a variant of execution.

FIG. 4 shows a variant of the driving dog. The driving dog 23 having teeth 24 is shaped as a stepped body, a pressure spring 25 being inserted around the lower portion having a reduced diameter. In this embodiment too, the pressure spring supports on the thrust member. The lever 20 has the same clip 29 and the same swelling 32 as in the previous embodiment, its front portion being however fork shaped and acting on an incision 27 at the lower portion of the driving dog.

Figure 6:
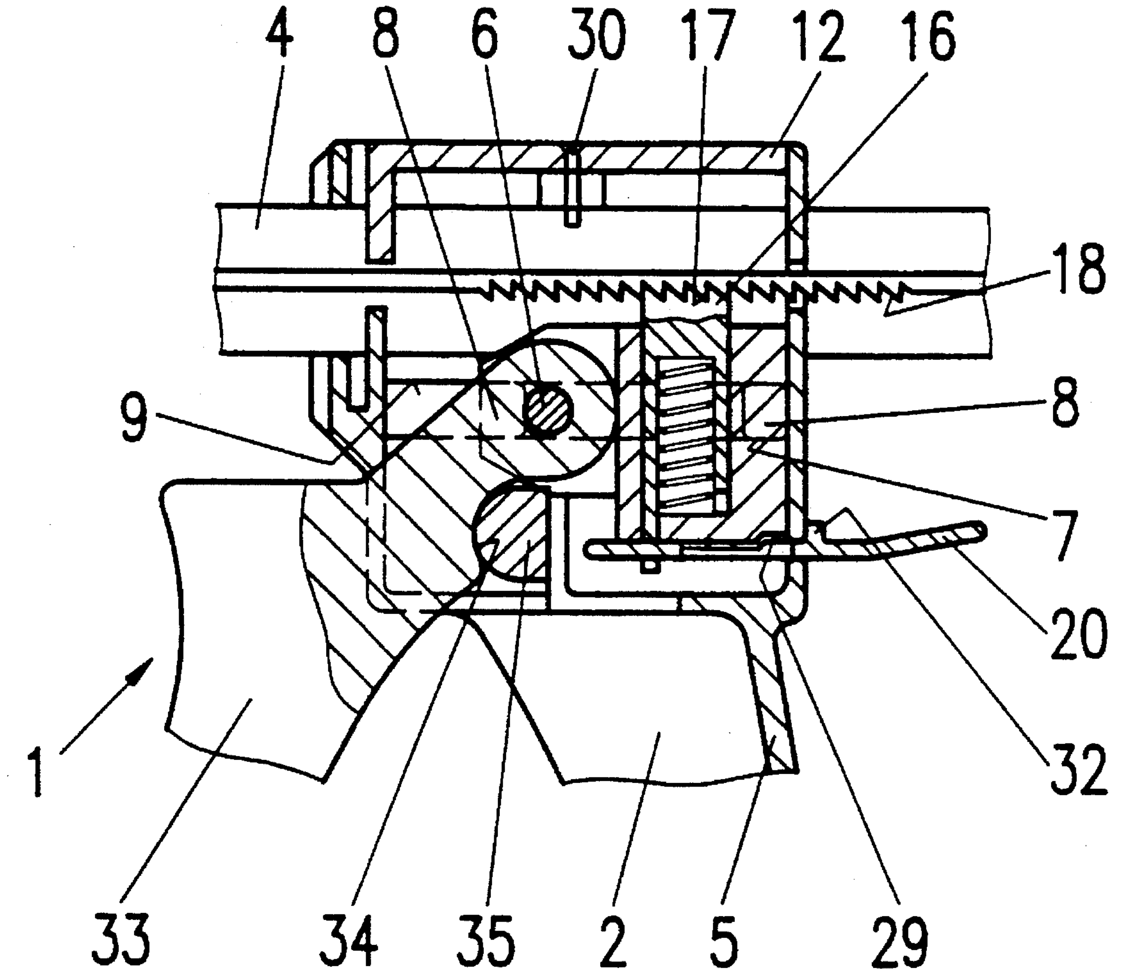
FIG. 6 shows another variant of execution of the device of FIG. 1.

A variant of the embodiments is shown in FIG. 6 where the arc compensating elements are not necessarily articulated to the trigger lever. The trigger lever 33 has a recess 34 below the bolt 6 which embraces a semi-circular arc compensating element 35; the latter also serves as a rotational axle. The arc compensating element 35 is pushed downward on actioning the trigger lever, and in this variant too, the sledge does not yield upward but the trigger lever yields downward.

Figure 7:
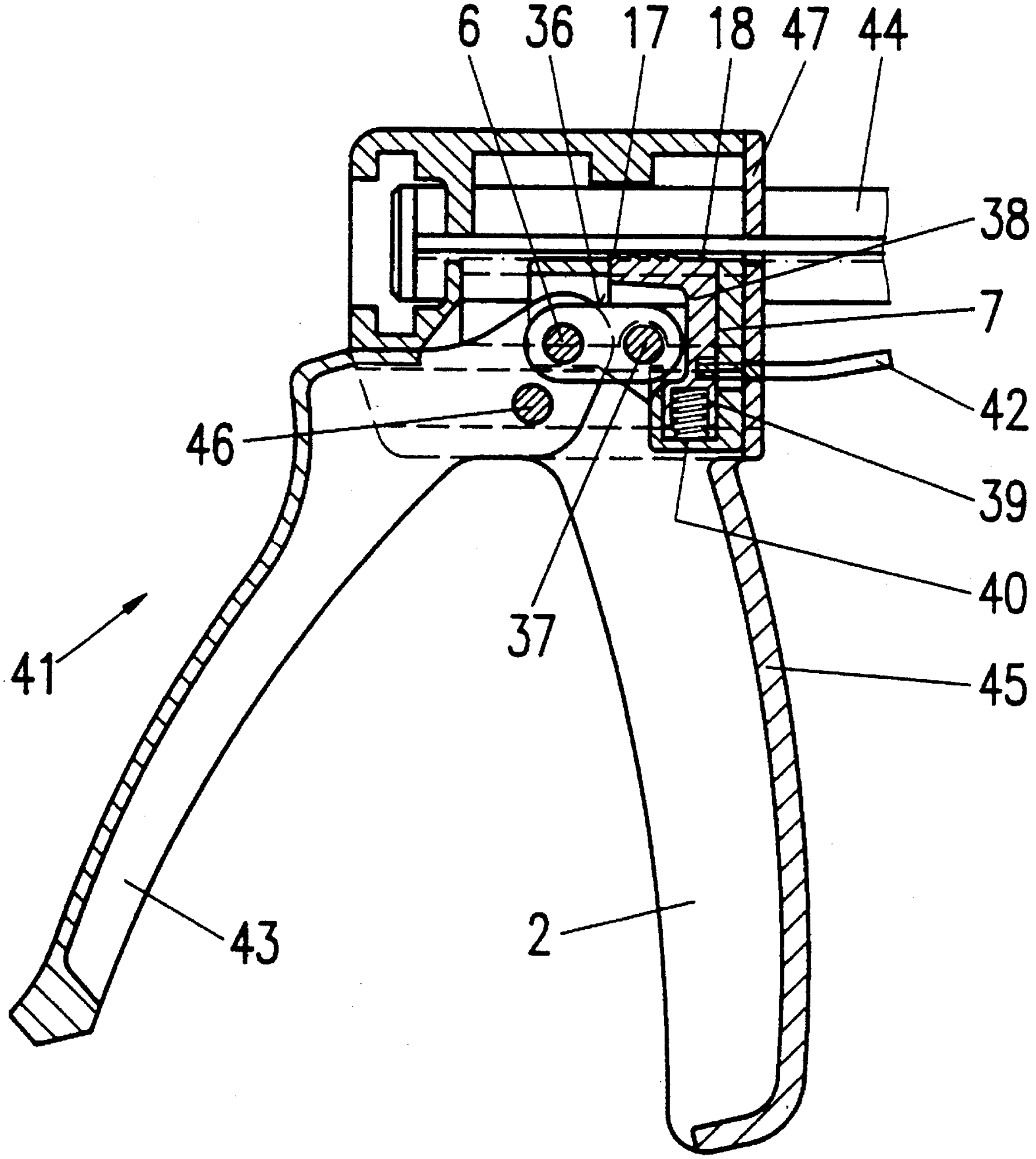
FIG. 7 shows another embodiment of a dispensing device according to the present invention.

The embodiment of FIG. 7 contains some simplifications, particularly in that, first of all, the arc compensating movement is realized by a joint bar. In this context, only those parts and features are described which differ substantially from those of the foregoing examples. The trigger lever 43 of device 41 is articulated to the housing 45 by a bolt 46 and is connected by the bolt 6 to an arc compensating joint bar 36 which is in turn rotatably connected by an axle 37 to the thrust member 7 containing the driving dog 38. Above joint bar 36, the driving dog 38 is cut-out with some clearance for being able to execute the vertical movement, and comprises several teeth 17 for meshing with toothing 18.

At its end which is articulated to the thrust member 7 the joint bar 36 is able to make a linear movement only, whereas its other end is connected to the trigger lever 43 in such a manner that the arcuate movement is effected at that location, this construction enabling a maximal volume utilisation too.

In contrast to the preceding embodiments, the driving dog 38 has a small hollow space 39 at its end portion directed to the handle, this hollow space containing a pressure spring 40 which supports on the thrust member. As a variant, the driving dog lever 42 is arranged not entirely at the bottom but slightly above the pressure spring and acts at this location on the driving dog 38 in order to decouple the same for the retreat of the thrust rams 44. Furthermore, closure 47 is not provided at the top like in the previous embodiments but screwed on at the side directed to the cartridge, whereby the thrust bearing otherwise on the housing and the cover is not received on screws, this execution facilitating further the assembly.

The device further comprises a friction brake 26 (FIG. 2) acting upon the thrust rams; this brake has already been described in detail in the European Specification No. 0,252,401 (corresponding to U.S. Pat. No. 0,252,401) of the same applicant and allows a grip repetition by overcoming the traction forces between the thrust ram and the driving dog after the dispensing stroke.

It becomes evident from the description and the drawing that the device is composed of few, unexpensive components only which can very easily be put together. It is however essential that all parts which are important for the actuating mechanism can be inserted into the lower part of the housing and secured by placing the cover on the housing and screwing or clamping it down, or by pushing it into the grooves of the housing. The large receiving surface between the teeth on the driving dog and the toothing of the thrust rams allow a substantial decrease of the specific application pressure and thus the use of low-priced synthetic materials. Furthermore, the fine toothing enables a fast re-gripping by the trigger lever and results in a very small backlash of it.

Furthermore, the construction of the trigger lever according to the invention in the region of the axles allows a greater volume with the same construction length in comparison to the known devices of the prior art and thus its production with low-priced synthetic materials instead of metal.

I claim:

1. A manually operated dispensing device for double dispensing cartridges for delivering two-component compositions, comprising;

a housing;

a double thrust ram; and drive means jointly acting upon the double thrust ram and being actuated by a trigger lever, said drive means comprising a thrust member driving said thrust ram via a toothing of the thrust ram, wherein said thrust member comprises a driving dog being under the action of a spring and having several teeth, said driving dog acting essentially perpendicularly on the toothing of said thrust ram, and means for moving said thrust member substantially only in the direction of the thrust ram upon actuation by said trigger lever.

2. The dispensing device of claim 1, wherein the driving dog comprises a hollow space in which the spring is lodged, said driving dog being connected to a lever traversing the housing.

3. The dispensing device of claim 1, wherein two pullback springs supported on the housing bias the thrust member into a starting position.

4. The dispensing device of claim 1, wherein the housing the thrust ram, the driving dog and the thrust member as well as the trigger lever are all made from synthetic material.

5. The dispensing device of claim 1, wherein said drive means is substantially disposed in a lower part of the housing and is held in place by a cover secured to the housing.

6. The dispensing device of claim 1, further comprising a friction brake acting upon the thrust ram.

7. The dispensing device of claim 1, wherein the trigger lever is articulated to said thrust member via at least one arc compensating element which is guided essentially parallel to said thrust ram.

8. The dispensing device of claim 7, wherein said arc compensating element is shaped as a joint bar, one end of the joint bar being articulated by a bolt to said thrust member and guided by a guide means for linear movement of said one end of the joint bar, the other end of the joint bar being connected by a second bolt to the trigger lever in such a manner that said other end of the joint bar follows the arcuate movement of the trigger lever.

9. The dispensing device of claim 1, wherein the trigger lever is articulated to said thrust member by a bolt and coacts with at least one arc compensating element, and further comprising means for slidingly guiding said at least one arc compensating element essentially perpendicularly to said thrust ram.

10. The dispensing device of claim 9, wherein the arc compensating element comprises two sliding blocks which are articulated to the trigger lever by an axle and which are slidingly guided within compartments in the housing.

11. The dispensing device of claim 9, wherein the rotational axis of the trigger lever is represented by a semicircular body serving as the arc compensating element, said body embracing a corresponding recess of the trigger lever.

* * * * *